United States Patent [19]

Machida et al.

[11] Patent Number: 5,456,965
[45] Date of Patent: Oct. 10, 1995

[54] CURVED HONEYCOMB STRUCTURAL BODIES

[75] Inventors: Minoru Machida, Nagoya; Masaomi Kamiya, Chiryu, both of Japan

[73] Assignee: NGK Insulators, Ltd., Japan

[21] Appl. No.: 149,727

[22] Filed: Nov. 10, 1993

[30] Foreign Application Priority Data

Nov. 20, 1992 [JP] Japan .................................. 4-312182

[51] Int. Cl.$^6$ ...................................................... B32B 3/12
[52] U.S. Cl. ............................ 428/116; 428/118; 428/188
[58] Field of Search ............................... 428/116, 118, 428/188; 502/527; 264/177.12; 52/806

[56] References Cited

U.S. PATENT DOCUMENTS

| | | |
|---|---|---|
| 3,903,341 | 9/1975 | Gerhold .................................. 428/116 |
| 3,905,775 | 9/1975 | Sowards et al. ..................... 428/116 X |
| 4,233,351 | 11/1980 | Okumura et al. ...................... 428/116 |
| 4,329,162 | 5/1982 | Pitcher, Jr. ............................ 428/188 X |
| 4,461,323 | 7/1984 | Morikawa et al. ...................... 138/115 |
| 4,578,303 | 3/1986 | Kundinger et al. ..................... 428/116 |
| 4,777,070 | 10/1988 | Huvey .................................... 428/116 |
| 4,840,827 | 6/1989 | Mizutani et al. ...................... 428/116 |
| 5,393,587 | 2/1995 | Machida et al. ....................... 428/116 |

FOREIGN PATENT DOCUMENTS 52-78965  7/1977  Japan ..................................... 428/116

Primary Examiner—Henry F. Epstein
Attorney, Agent, or Firm—Parkhurst, Wendel & Rossi

[57] ABSTRACT

A curved honeycomb structural body having a number of through holes extending through the structural body along a direction in which the honeycomb structural body is curved. Thicknesses of interior walls defining through holes are set larger on a radially outer side of the curved portion than on a radially inner side thereof.

8 Claims, 8 Drawing Sheets

FIG_1

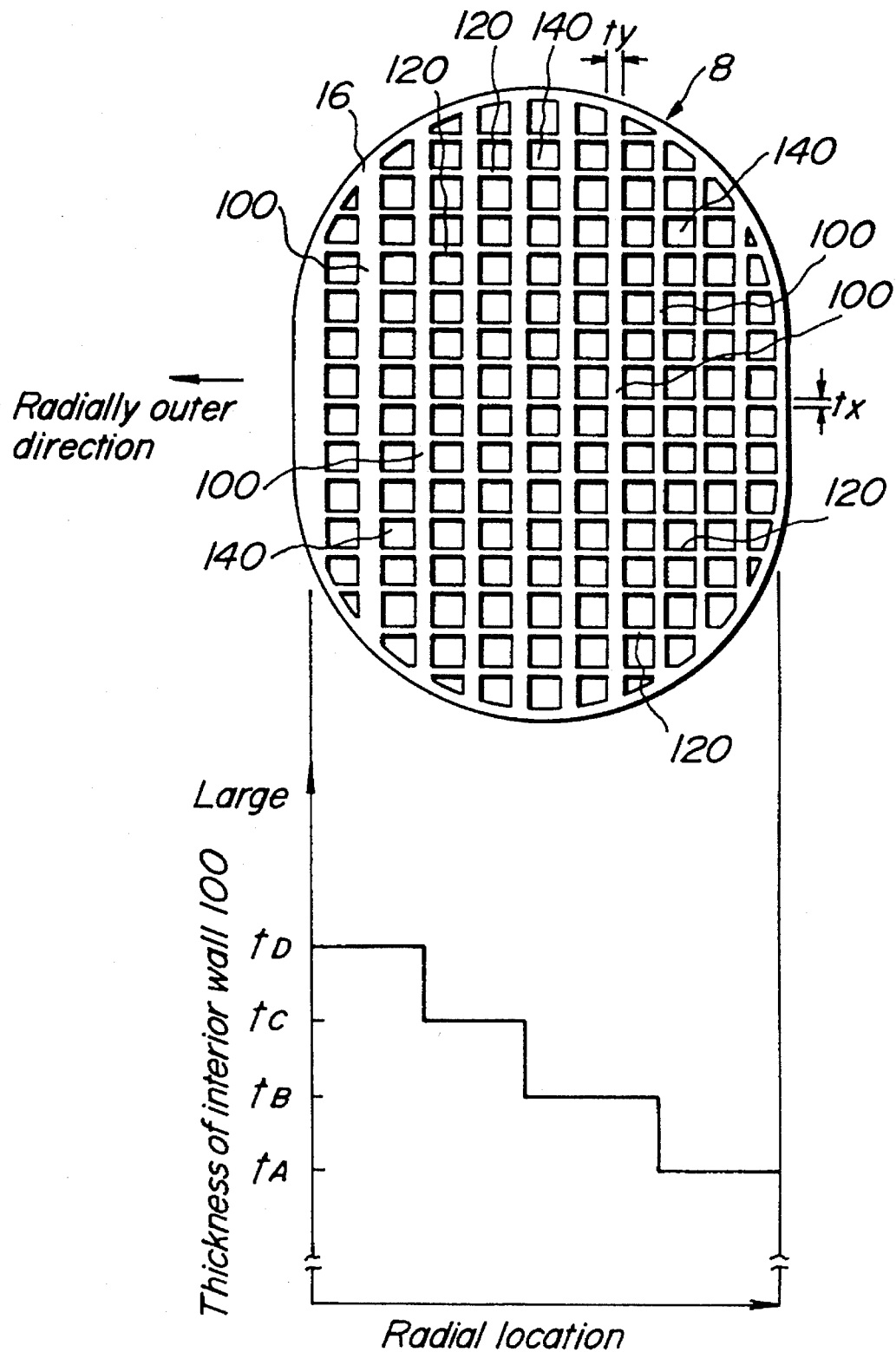

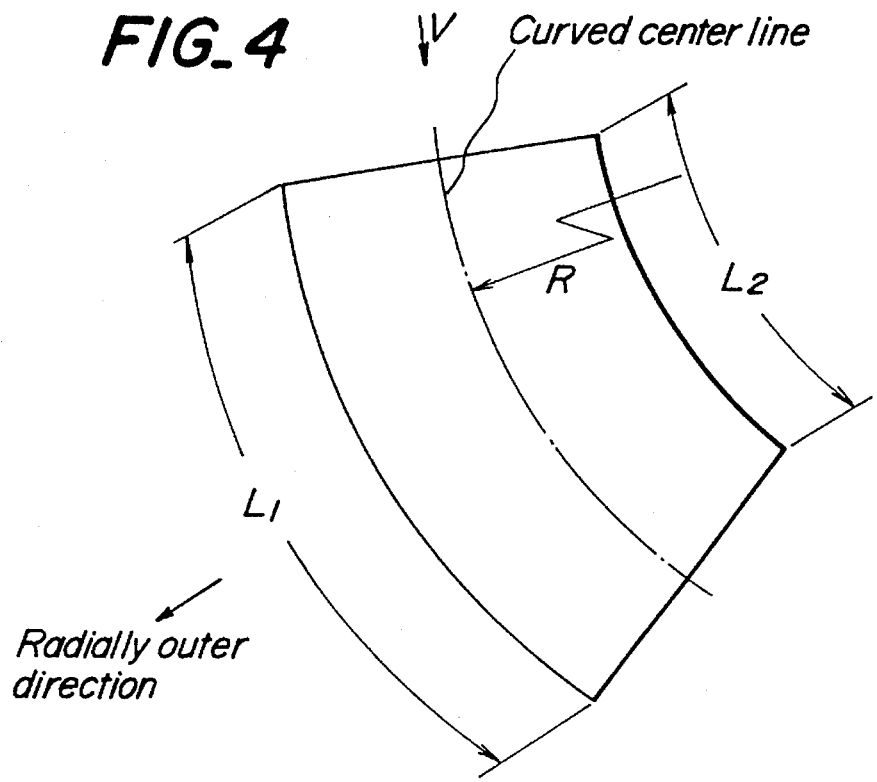
FIG._4
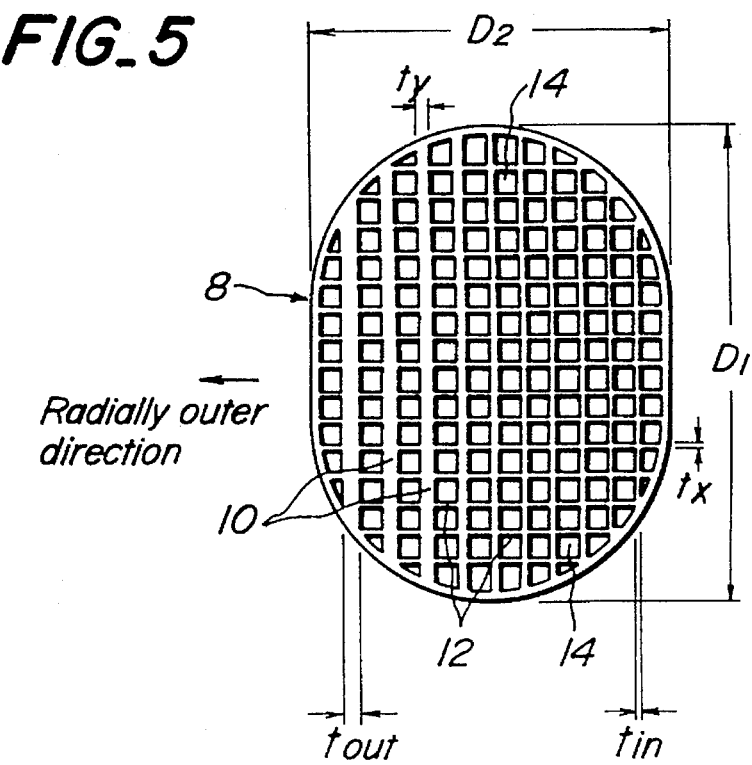
FIG._5

FIG_6
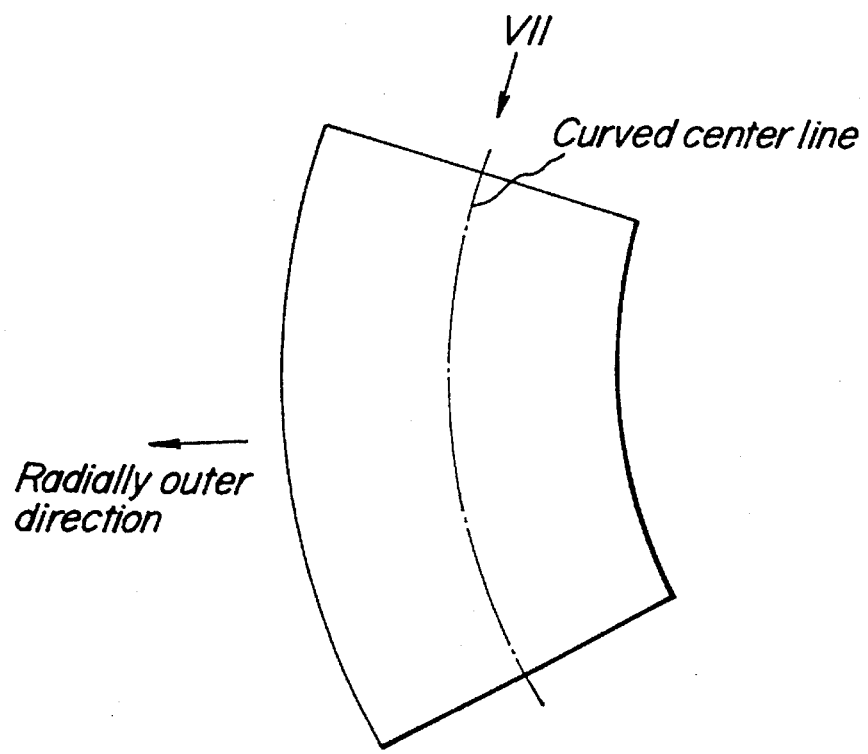
FIG_7
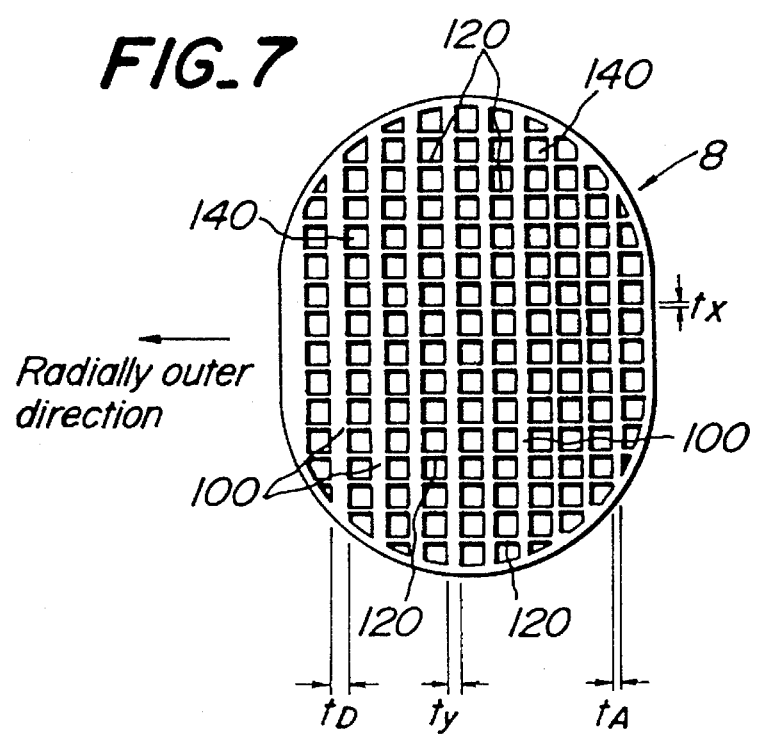

FIG_8
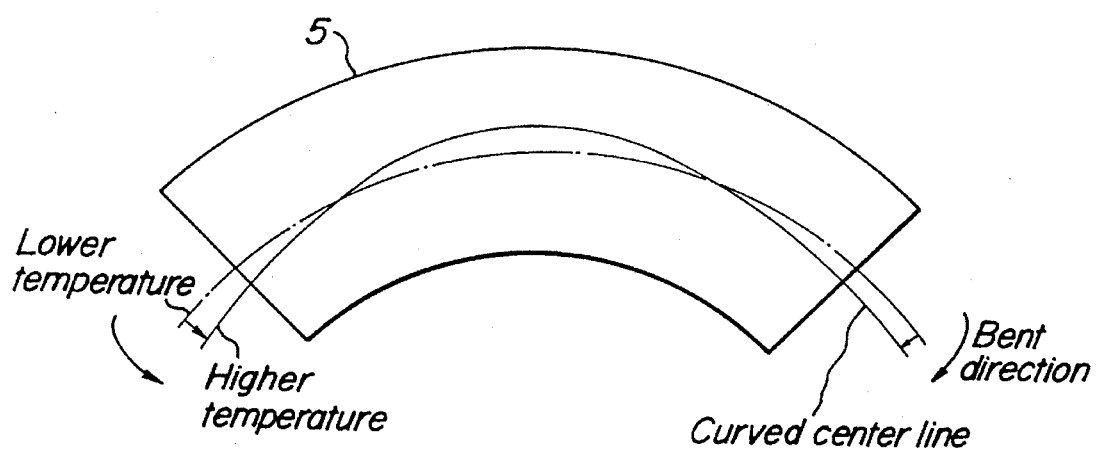
FIG_9
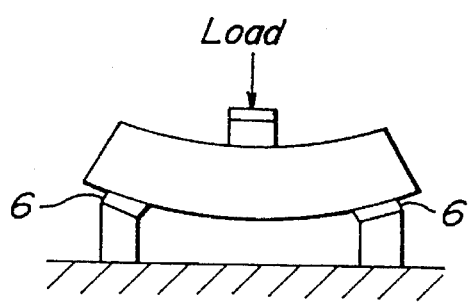

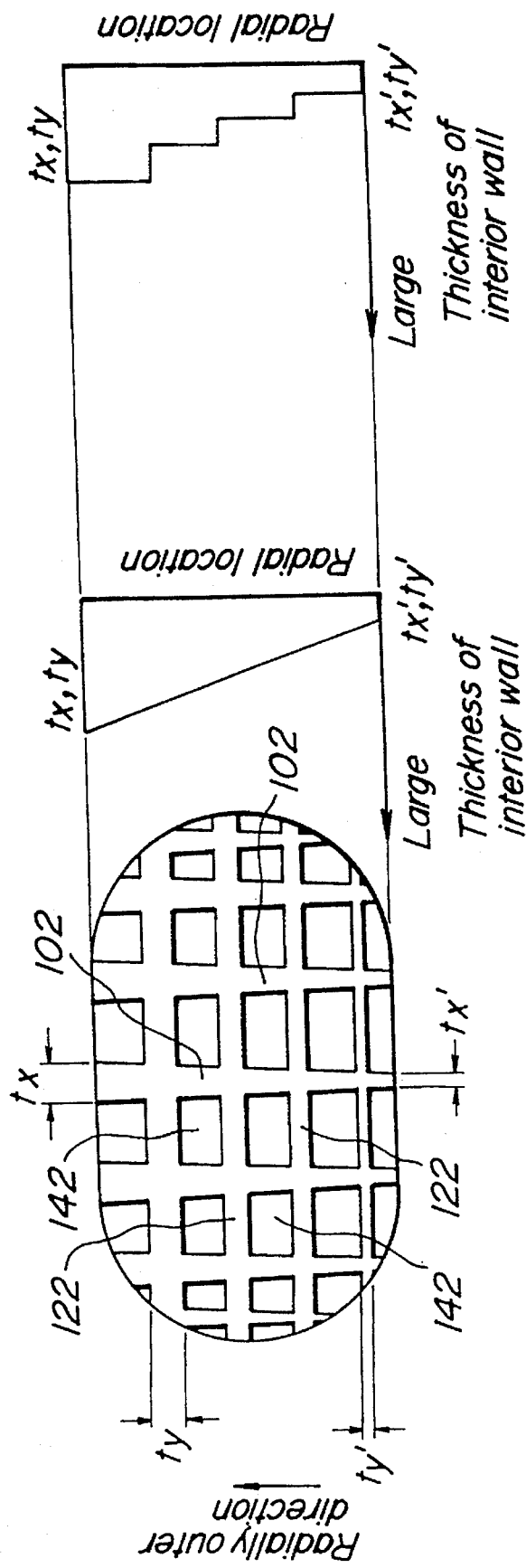

CURVED HONEYCOMB STRUCTURAL BODIES

BACKGROUND OF THE INVENTION (1) Field of the Invention

The present invention relates to curved honeycomb structural bodies formed by extruding a molding material such as a ceramic or a resin.

(2) Related Art Statement

In general, honeycomb structural bodies having a number of through holes are molded by extrusion. It is not easy for molding engineers to produce such honeycomb structural bodies by a process other than the extruding process. Therefore, in the conventional honeycomb structural bodies which are molded by extruding a material such as ceramic or resin, straight passages (through holes) are usually formed in an extruding direction.

Although a concept (configuration) of a honeycomb structural body having a curved shape can be illustrated and represented, such a curved honeycomb structural body cannot be easily actually produced. This is clear in view of the fact that it is difficult to finely define and constitute a number of curved passages with walls having a uniform thickness.

Japanese Patent application Laid-open No. 52-78,965 discloses a process for producing curved honeycomb structural bodies, in which lengths of passages of a die itself positioned in an extruding section of an extruder are variable to curve the honeycomb structural body toward a side of straight long passages having larger flow resistance.

However, according to this curved honeycomb structural body-producing process, since the widths of through holes (passages) of the extruding die are constant, the thicknesses of the interior walls extending in a curved direction are constant in the case of the honeycomb structural body extruded through the extruding die.

Therefore, in the curved honeycomb structural bodies obtained by the above process, the axial lengths of the interior walls are greater on the radially outer side of the curved portion than on the radially inner side thereof from the structural standpoint of view. Consequently, the thermal stress on the radially outer portion of the curved portion due to application and removal of thermal load is greater than that that on the radially inner side of the curved portion. Therefore, the interior walls on the radially outer side of the curved portion are likely to be fractured or cracked.

For example, when the above curved honeycomb structural body is used as a catalyst carrier for an automobile exhaust gas purification catalyst converter, the honeycomb structural body is placed in a metallic casing through an elastic body so that the catalyst carrier will not be fractured or cracked, in view of the fact that the honeycomb structural body is made of a brittle ceramic material such as cordierite. Such a catalyst converter ordinarily reaches temperatures around 800° C. In general, when the catalyst converter is heated from room temperature to an operating temperature (high temperature), the thermal expansion of the metallic casing holding the honeycomb structural body is greater than that of the honeycomb structural body, the radially outer side of the metallic casing becomes greater. Consequently, as shown in FIG. 8, the honeycomb structural body 5 placed in the metallic casing 8 is subjected to a thermal load which makes the curved degree of the honeycomb structural body greater, with the result that the thermal expansion of the honeycomb structural body becomes greater on the radially outer side to make the honeycomb structural body easily fracturable.

SUMMARY OF THE INVENTION

It is an object of the present invention to solve the above problems, and to provide a high rigidity curved honeycomb structural body which is less fracturable against repeated application of thermal loads.

In order to attain the above object, the curved honeycomb structural body according to the present invention is directed to a curved honeycomb structural body having a number of through holes penetrating along a direction in which the honeycomb structural body is curved, wherein thicknesses of interior walls defining through holes are larger on a radially outer side than on a radially inner side.

For example, it is preferable that the thicknesses of the interior walls orthogonal to the radial direction of the honecomb structural body in a cross section are increased linearly or stepwise in a direction from the radially inner side to the radially outer side. The cross-sectional shape of each of the through holes is preferably square, rectangular, triangular or hexagonal. The cross-sectional shape of each of the through holes may be of any other shape than above.

When the cross sectional shape of each of the through holes of the honeycomb structural body is square, the thicknesses of the radially extending interior walls extending in the radial direction of the honeycomb structural body in the cross section are constant. This is because a die for extruding the honeycomb structural body with the radially extending inner walls having a uniform thickness can be more easily produced, as compared with a die extruding a honeycomb structural body having the thickness of the interior wall varied. When the honeycomb structural body has square through holes as viewed in cross section, the thicknesses of the interior walls extending in the radial direction of the honeycomb structural body as viewed in the cross sectional plane are an intermediate value between a maximum thickness and a minimum thickness of the interior walls extending in a direction orthogonal to the radial direction.

When the curved honeycomb structural body is used as a catalyst carrier for an exhaust gas purification catalyst converter, the curved honeycomb structural body is preferably constituted by cordierite having a considerably smaller coefficient of thermal expansion among ceramic materials.

The curved honeycomb structural body according to the present invention favorably has a catalyst carried on surfaces of interior walls.

The curved honeycomb structural body preferably has a feature that a cross sectional shape of the honeycomb structural body is elliptical, and the thicknesses of the interior walls extending in a direction orthogonal to a direction in which a major axis extends are gradually increased linearly or stepwise in a direction from the radially inner side to the radially outer side.

According to the curved honeycomb structural bodies of the present invention, since the thicknesses of the interior walls (the thickness of ribs) constituting the through holes are made greater on the radially outer side of the curved portion than on the radially inner side thereof, resistance to thermal loads is high.

These and other objects, features and advantages of the invention will be appreciated upon reading of the following description of the invention when taken in conjunction with the attached drawings, with the understanding that some modifications, variations or changes of the same could be made by the skilled person in the art to which the invention pertains, without departing from the spirit of the invention or the scope of claims appended hereto.

BRIEF DESCRIPTION OF THE DRAWINGS

For a better understanding of the invention, reference is made to the attached drawings, wherein:

FIG. 3 is a schematic view of a second embodiment of the curved honeycomb structural body according to the present invention with respect to the shape and the thickness;

FIG. 4 is a schematic view for illustrating the structure of the first embodiment according to the present invention when an experiment is carried out;

FIG. 5 is a view of the embodiment in FIG. 4 as viewed from an arrow V;

FIG. 6 is a schematic view for illustrating the structure of the second embodiment according to the present invention when an experiment is carried out;

FIG. 7 is a view of the embodiment in FIG. 6 as viewed from an arrow VII;

FIG. 8 is a view for illustrating a displacement of a central curved line of the honeycomb structural body with change in temperature;

FIG. 9 is a view for illustrating a method of measuring rupture strength of the curved honeycomb structural body;

FIGS. 10(a) and 10(b) is a view for illustrating the structures of third and fourth embodiments which were tested in the present invention.

DETAILED DESCRIPTION OF THE INVENTION

Embodiments according to the present invention will be explained in more detail with reference to the attached drawings.

Figure 1:
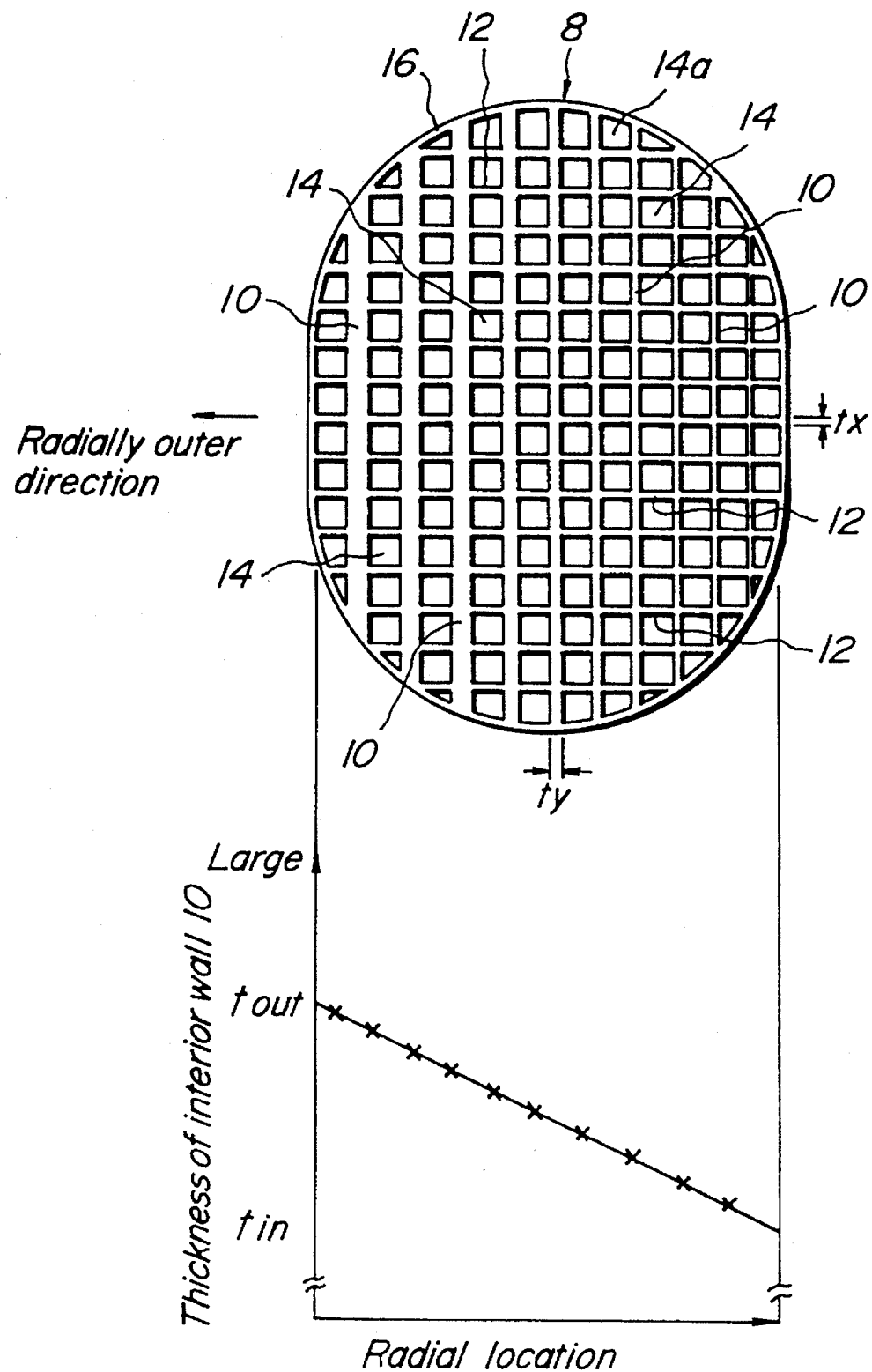
FIG. 1 is a schematic view for illustrating a curved honeycomb structural body as a first embodiment of the present invention with respect to the shape and the thickness.
Figure 2:
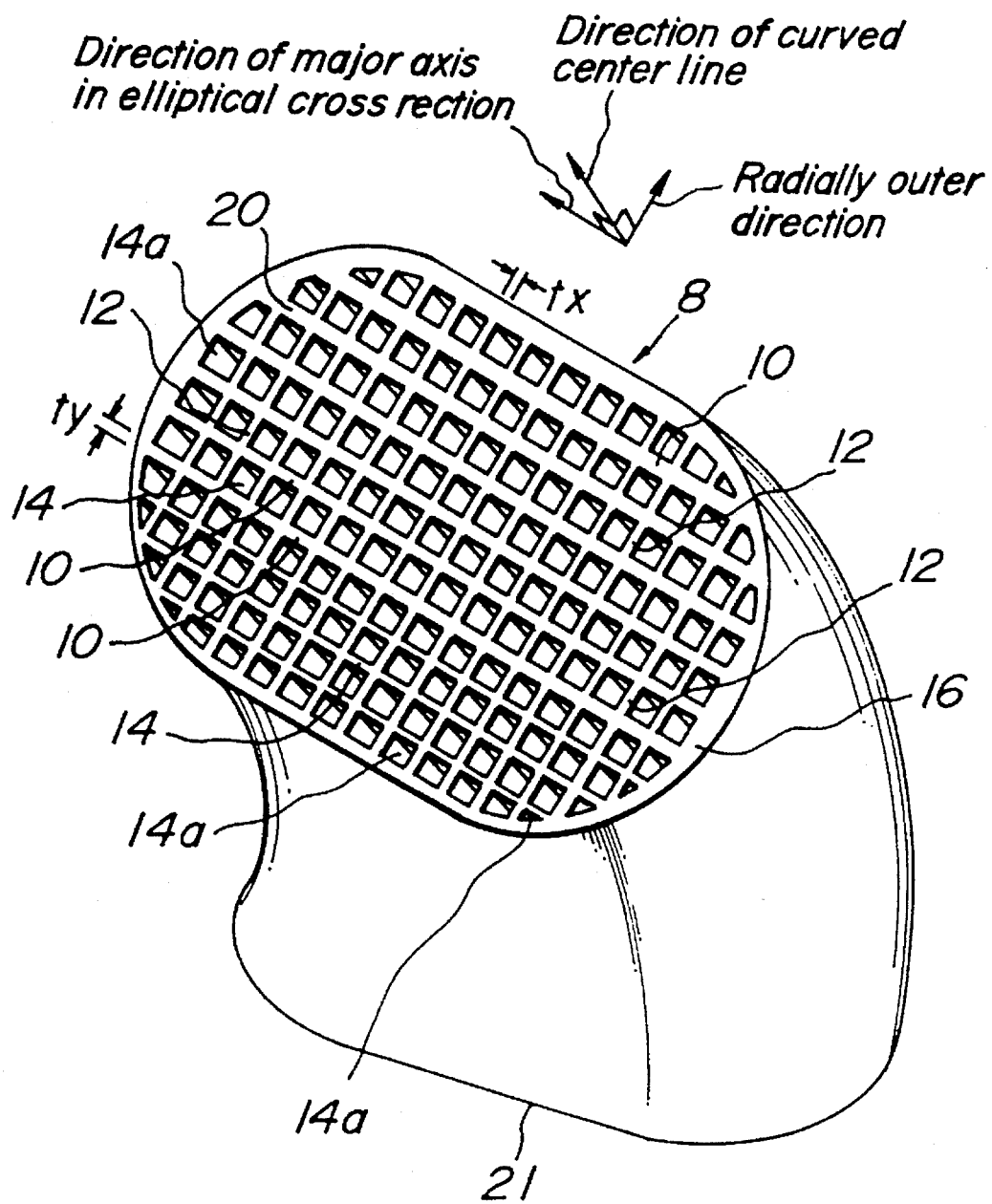
FIG. 2 is a perspective view for illustraing the curved honeycomb structural body according to the first embodiment of the present invention.

FIGS. 1 and 2 illustrate a first embodiment of the curved honeycomb structural body which is to be applied to a catalyst converter connected to an exhaust pipe for an automobile engine.

The curved honeycomb structural body 8 of the first embodiment has an elliptical shape of an outer profile in a cross section and a square shape of a cell (a cross sectional shape of a through hole 14). The curved honeycomb structural body has the following structure. That is, interior walls 10 extending in a direction of a major axis in the elliptical cross section intersect interior walls 12 extending in a direction of a minor axis in the elliptical cross section (radial direction) in a lattice fashion, thereby forming a number of through holes (curved passages) 14. The interior walls 10 and the interior walls 12 extend along a curved central axis. Curved passages 14 defined by the crossing interior walls 10 and 12 extend parallel to a curved direction, and penetrate the honeycomb structural body from one end face 20 to the other end face 21 as shown in FIG. 2. An exterior wall 16 having a given thickness is formed in an annular shape having an elliptical cross section to close the through holes 14a on the outermost side of the honeycomb structural body. The cross sectional area of each curved passage is constant, excluding those of the curved passages on the outermost side of the honeycomb structural body.

In this embodiment, the thicknesses "t" of the interior walls are as follows. That is, (1) the thicknesses "tx" of the interior walls 12 extending in the radial direction are constant, and (2) the thicknesses "ty" of the interior walls 10 extending in the direction of the major axis in the elliptical cross section continuously (linearly) increases as the interior walls go from the radially inner side to the radially outer side. The relationship between the radial location and the thickness "ty" of the interior wall 10 is shown in FIG. 1. The thickness "ty" takes a maximum thickness "$t_{out}$ ($t_{max}$)" on the radially outermost side, while the thickness "ty" takes a minimum thickness "$t_{in}$ ($t_{min}$)" on the radially innermost side as the thickness "ty" continuously decreases toward the radially inner side ($t_{max} > t_{min}$; $t_{out} > t_{in}$).

Next, a second embodiment of the curved honeycomb structural body according to the present invention is shown in FIG. 3. In this embodiment, the thicknesses of the interior walls 110 extending in a direction of a major axis in an elliptical cross section are stepwise increased as the interior walls go from the radially inner side to the radially outer side. An exterior wall 16 has the same function as in the first embodiment.

The thicknesses "t" of the interior walls constituting through holes 140 are set as follows. That is, (1) the thicknesses "tx" of the interior walls 120 extending in the radial direction are constant. This is because variation in the thermal loads is smaller in the major axis direction of the elliptical cross section is smaller as is the same as in the first embodiment. (2) The thicknesses "ty" of the interior walls 100 extending in the direction of the major axis stepwise increases as the interior walls go from the radially inner side to the radially outer side. The thickness "ty" of the interior walls 100 takes a maximum value "$t_D$" on the radially outermost side, and decreases successively through thicknesses $T_C$ and $T_B$ as the interior walls go from the radially outer side to the radially inner side. The thickness "ty" takes a minimum value $t_A$ on the radially innermost side. The thicknesses of the interior walls are varied among totally four values.

In this second embodiment, since the thickness "ty" is stepwise varied, the embodiment has a merit that an extruding die for the formation of the honeycomb structural bodies can be easily produced as compared with the first embodiment.

Next, a third embodiment of the curved honeycomb structural body according to the present invention will be illustrated in FIG. 10(a). In this embodiment, the thicknesses of the interior walls 102 and 122 are gradually increased linearly as the interior walls go from the radially inner side to the radially outer side.

The thicknesses of the interior walls constituting through holes 142 are set as follows. That is, (1) the thicknesses "tx" of the interior walls 102 extending in the radial direction are increased as the interior walls go from the radially inner side to the radially outer side, and (2) the thicknesses of the interior walls extending in a direction of a major axis in a radial cross section are also gradually increased linearly as the interior walls go from the radially inner side to the radially outer side. The thicknesses "ty" of the interior walls 122 take a maximum thickness "tx" of the interior wall on the radially outermost side, and are decreased as the interior walls go from the radially outer side to the radially inner side. In this third embodiment, both the thicknesses "tx" and "ty" are varied linearly.

Further, a fourth embodiment of the curved honeycomb structural body according to the present invention will be illustrated in FIG. 10(b). In this embodiment, the thicknesses of the interior walls 102 and 122 are stepwise increased as the interior walls 102, 122 go from the radially inner side to the radially outer side, although this is not necessarily clearly illustrated because the same cross sectional view is employed for illustration of both FIGS. 10(a) and 10(b).

The thicknesses "t" of the interior walls constituting through holes 142 are varied as follows. That is, (1) the thicknesses "tx" of the interior walls extending in the radial direction are gradually increased as the interior walls go from the radially inner side to the radially outer side, and (2) the thicknesses "ty" of the interior walls 112 extending in a direction of a major axis are stepwise increased as the interior walls go from the radially inner side to the radially outer side. The thicknesses "ty" of the interior walls 112 take a maximum thickness on the radially outermost side, and is decreased as the interior walls go from the radially outer side to the radially inner side. In this fourth embodiment, the thicknesses "tx" are varied linearly.

In the following, data obtained with respect to curved honeycomb structural bodies according to the present invention and a comparative example are given in Table 1.

example corresponds to the embodiments shown in FIGS. 1 and 2.

Example 2 is a case in which as shown in FIGS. 6 and 7, the thicknesses "tx" of radially extending interior walls are constant and the thicknesses "ty" of the interior walls extending in a direction of a major axis in an elliptical cross section are decreased by four steps of $t_A$, $t_B$, $t_C$ and $t_D$ as the interior walls go from the radially outer side to the radially inner side.

Example 3 is a case in which as shown in FIG. 10(a), the thicknesses "tx" of radially extending interior walls are linearly increased as the interior walls go from the radially inner side to the radially outer side, and the thicknesses "ty" of the interior walls extending in a direction of a major axis in the elliptical cross section are linearly increased as the interior walls go from the radially inner side to the radially outer side.

Example 4 is a case in which as shown in FIG. 10(b), the thicknesses "tx" of radially extending interior walls are stepwise increased as the interior walls go from the radially inner side to the radially outer side, and the thicknesses "ty" of the interior walls extending in a direction of a major axis in the elliptical cross section are stepwise increased as the interior walls go from the radially inner side to the radially outer side.

Comparative Example 1 is a case in which the thicknesses "tx" of the interior walls extending in the radial direction and the thicknesses "ty" of the interior walls extending in the major axis direction in the elliptical cross section are made equal to each other and constant.

TABLE 1

| | Shape of cell cross section | Shape of honeycomb cross section | Length of major axis $D_1$ (mm) | Length of minor axis $D_2$ (mm) | Effective length of honeycomb structural body on radially outer side $L_1$ (mm) | Effective length of honeycomb structural body on radially inner side $L_2$ (mm) |
|---|---|---|---|---|---|---|
| Example 1 | rectangular | elliptical | 95 | 70 | 145 | 115 |
| Example 2 | rectangular | elliptical | 95 | 70 | 145 | 115 |
| Example 3 | square | elliptical | 95 | 70 | 145 | 115 |
| Example 4 | rectangular | elliptical | 95 | 70 | 145 | 115 |
| Comparative Example 1 | rectangular | elliptical | 95 | 70 | 145 | 115 |

| | Radius of curvature R (mm) | Maximum thickness of interior wall extending in direction of major axis in cross section $t_{out}$ (mm) | Minor thickness of interior wall extending in direction of major axis in cross section $t_{in}$ (mm) | Thickness of interior walls extending in radial direction tx (mm) | Thickness of interior walls extending in radial direction tx' (mm) | Bending strength (KN) |
|---|---|---|---|---|---|---|
| Example 1 | 300 | 0.45 | 0.15 | 0.30 | 0.30 | 30 |
| Example 2 | 300 | 0.45 | 0.15 | 0.30 | 0.30 | 34 |
| Example 3 | 300 | 0.45 | 0.15 | 0.30 | 0.15 | 42 |
| Example 4 | 300 | 0.30 | 0.15 | 0.30 | 0.15 | 59 |
| Comparative Example 1 | 300 | 0.15 | 0.15 | 0.15 | 0.15 | 21 |

Example 1 is a case in which as showin in FIGS. 4 and 5, the thicknesses "tx" of radially extending interior walls are constant and the thicknesses "ty" of the interior walls extending in a direction of a major axis in an elliptical shape are increased linearly as the interior walls go from the radially inner side to the radially outer side. That is, this Experimental methods are as follows. First, each of above Examples 1, 2, 3 and 4 and Comparative Example 1 as honeycomb structural bodies was supported by cushions 6 at opposite ends as shown in FIG. 9, and was fractured by applying a concentrated load at a speed of 5 mm/min. in a direction from a radially inner side to a radially outer side in which an external force is exerted upon the honeycomb structural body at high temperatures. Results are also shown in Table 1.

As a result of the experimentation, Comparative Example exhibited bending strength of 21 KN, whereas Invention Examples 1, 2, 3 and 4 exhibited bending strengths of 30 KN, 34 KN, 41 KN and 59 KN, respectively. From the above results, it is seen that Invention Examples 1, 2, 3 and 4 exhibited greater reinforcing effect and greater bending strength as compared with Comparative Example 1. Since the thicknesses of the honeycomb structural bodies in the Invention Examples are greater on the radially outer side, the bending strength is increased to make the honeycomb structural bodies more rigid.

Figure 11A:
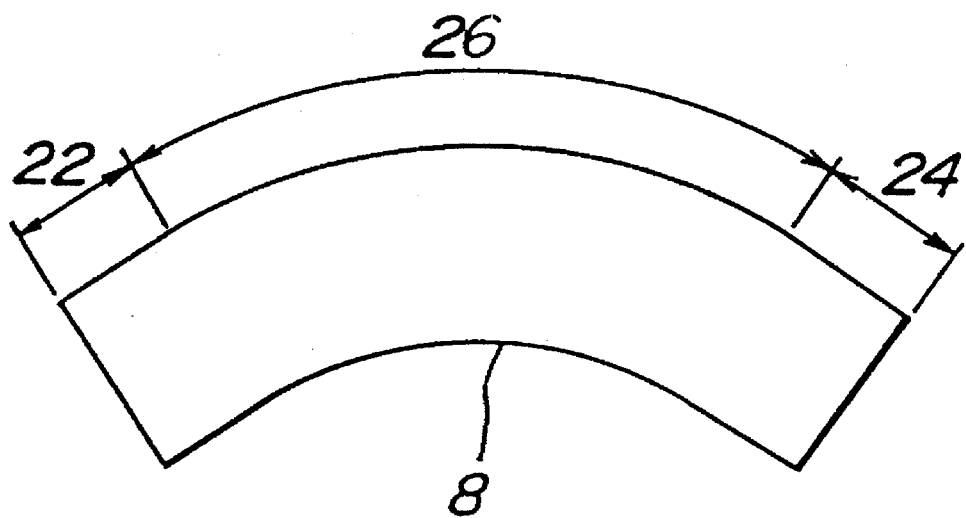
FIGS. 11(a) and 11(b) are views for illustrating modifications of the curved honeycomb structural bodies.
Figure 11B:
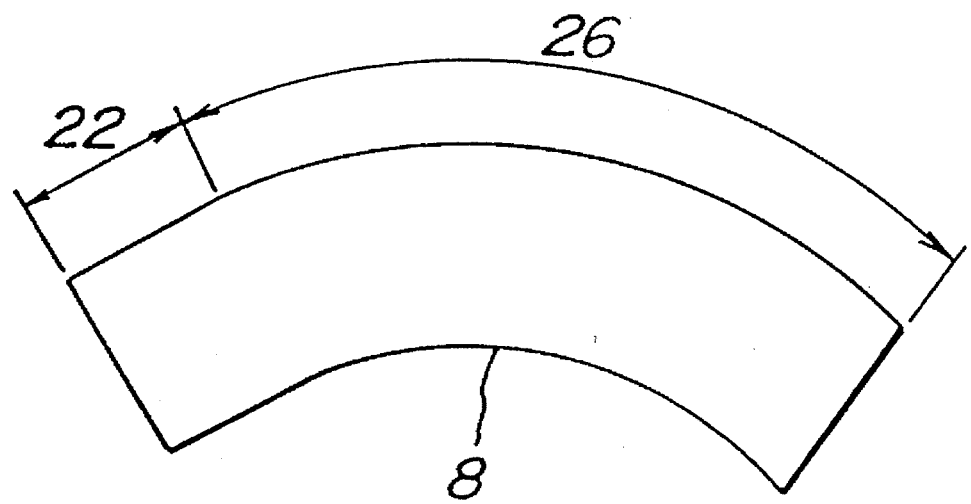

The honeycomb structural body fundamentally has a shape having given radii of curvature as shown in FIG. 4. As shown in FIG. 11(a), straight portions 22, 24 are provided at opposite ends of the curved portion 26 having a given radius of curvature. Alternatively, as shown in FIG. 11(b), a straight portion 22 may be provided at one side of the curved portion 26 having given radii of curvature.

As having been explained above, according to the curved honeycomb structural body of the present invention, bending strength against exterior forces becomes greater in a curved direction, so that high rigidity honeycomb structural bodies can be obtained.

Furthermore, in the catalyst converters on which a catalyst is carried at surfaces of the interior walls of the honeycomb structural body, the honeycomb structural body is less likely to be damaged or fractured, with the result that durability is improved, and high purification effect upon exhaust gases can be maintained for a long time period.

What is claimed is:

1. A curved honeycomb structural body, comprising:
a curved portion which is curved along a curved direction, said curved portion comprising a plurality of interior walls defining through holes which extend along said curved direction, and exterior inner and outer radial curved surfaces, wherein thicknesses of said interior walls defining said through holes increase from said exterior inner curved surface to said exterior outer curved surface.

2. The body of claim 1, wherein the thicknesses of the interior walls are increased gradually linearly along a direction from the exterior inner curved surface to the exterior outer curved surface.

3. The body of claim 1, wherein the thicknesses of the interior walls are increased gradually stepwise along a direction from the exterior inner curved surface to the exterior outer curved surface.

4. The body of claim 1, wherein a cross-sectional shape of each of the through holes is square, rectangular, triangular, or hexagonal.

5. The body of claim 4, wherein the cross-sectional shape of each of the through holes is rectangular, triangular or hexagonal, and the thicknesses of the interior walls which extend radially are constant.

6. The body of claim 5, wherein the thicknesses of said interior walls which extend radially are set at an intermediate value which is between a maximum thickness and a minimum thickness of the interior walls which extend along a direction orthogonal to the radial direction.

7. The body of claim 1, further comprising a catalyst carried on surfaces of said interior walls.

8. The body of claim 1, wherein a cross-sectional shape of the honeycomb structural body is elliptical, and the thicknesses of the interior walls which extend along a direction orthogonal to the major axis of the honeycomb structural body are gradually increased linearly or stepwise along a direction from said exterior inner curved surface to said exterior outer curved surface.

* * * * *